United States Patent [19]
Schmuck

[11] Patent Number: 6,021,236
[45] Date of Patent: Feb. 1, 2000

[54] PROCEDURE AND DEVICE FOR CREATING AN OPTICAL OUTPUT SIGNAL

[75] Inventor: Harald Schmuck, Korntal-Münchingen, Germany

[73] Assignee: Alcatel, Paris, France

[21] Appl. No.: 09/131,642

[22] Filed: Aug. 10, 1998

[30] Foreign Application Priority Data

Aug. 21, 1997 [DE] Germany ............... 197 36 380

[51] Int. Cl.$^7$ ................................................. G02B 6/28
[52] U.S. Cl. ............................................................. 385/24
[58] Field of Search ........................... 385/24, 147, 32; 359/124, 189, 164, 172; 250/227.15, 227.16; 356/73.1; 395/500.46; 364/926.92, 927.81, 927.92, 927.94, 931.43

[56] References Cited

U.S. PATENT DOCUMENTS

| | | | |
|---|---|---|---|
| 5,144,467 | 9/1992 | Kitajima et al. | 359/124 |
| 5,367,305 | 11/1994 | Volker et al. | 342/368 |
| 5,550,667 | 8/1996 | Krimmel et al. | |
| 5,742,715 | 4/1998 | Boehlke et al. | 385/32 |
| 5,818,616 | 10/1998 | Kawai | 359/124 |
| 5,825,018 | 10/1998 | DiMarzio et al. | 250/208.1 |

FOREIGN PATENT DOCUMENTS

| | | |
|---|---|---|
| 2814716 | 8/1989 | Germany . |
| 3843786 | 7/1990 | Germany . |

OTHER PUBLICATIONS

"RACE R2005: Microwave Optical Duplex Antenna Link" by O'Reilly. In: IEE Proceedings J. vol. 140, No. 6, Dec. 1993, pp. 385–391.

"Theoretical Study of the Interferometric Bragg–Cell Spectrum Analyser" by Wilby. In: IEE Proceedings, vol. 133, Pt.J., No. 1, Feb. 1986, pp. 47–59.

"Introduction to Radar System", by Skolnik. McGraw–Hill Book Company, Inc. New York et al 1962, pp. 83–85.

*Primary Examiner*—Akm E. Ullah
*Attorney, Agent, or Firm*—Ware, Fressola, Van Der Sluys & Adolphson LLP

[57] ABSTRACT

A procedure for creating an optical output signal (S') in which two optical signal parts ($S_1$, $S_2$) of different frequencies are created from an optical signal (S) of a fixed frequency ($v_0$), whereby one of the optical signal parts ($S_1$, $S_2$) has a data signal (D) impressed and both optical signal parts ($S_1$, $S_2$) together form the optical output signal (S'), the optical signal (S) is fed to two branches (4, 5), two optical sideband carriers ($v_0-f_m$, $v_0+f_m$) are created in one of the two branches (4, 5) with regard to the optical signal (S), one sideband carrier of which is removed, the optical signal (S) in one of the two branches (4, 5) has a data signal (D) impressed and both divided optical signal parts (S1, S2) are then brought back together to form one single optical output signal (S'). In this way the effort required for creating both optical signal parts and/or the optical output signal can be reduced.

10 Claims, 2 Drawing Sheets

PROCEDURE AND DEVICE FOR CREATING AN OPTICAL OUTPUT SIGNAL

TECHNICAL FIELD

The invention presented refers to both a procedure for creating an optical output signal in which two optical signal parts of different frequencies are created from one optical signal of fixed frequency, where one of the two optical signal parts has an impressed data signal and both optical signal parts together form the optical output signal, as well as an optical transmission device for creating an optical output signal with two optical signal parts, comprising one of the two optical signal parts from a device creating an optical signal of fixed frequency and a modulator which impresses one of the two optical signals with a data signal.

BACKGROUND OF THE INVENTION

This type of procedure and this type of device for creating a optical output signal are already known, for example through the publication of J. J. O'Reilly et al., "RACE R2005: micro-wave optical duplex antenna link", IEB Proceedings—J, Vol. 140, No. 6, December 1993, pages 385–391.

The optical transmission device shown there in FIG. 2 (dual frequency optical source) comprises a DFB laser, a primary optical modulator, a signal source and an optical filter. The light emitted by the DFB laser is a continuous signal (continuous wave signal) with an optical frequency $v_0$ (carrier frequency). This light is fed to an input on the primary optical modulator which is controlled by the signal source. The light emerging from the optical modulator has a frequency spectrum with two impressed frequency parts (sideband carriers) which are arranged symmetrically, at the spacing of the modulation frequency $F_m$ of the signal source, around the suppressed optical carrier frequency $v_0$, i.e. both frequency parts have a frequency distance of $2\,F_m$. The optical filter switched after the output of the primary optical modulator separates both frequency parts which are respectively applied to an output on the optical filter.

In order to transmit light modulated by a data or message signal using such an optical transmission device, one (the first) output of the optical filter is connected to a second optical modulator and the other (second) output using a coupler. Using the data signal, the second optical modulator modulates the light part emerging at the first output of the optical filter. This is an external modulation of the light parts emerging at the output of the optical filter. The frequency spectrum of the modulated light part therefore has only one of the two frequency parts. This modulated light part which emerges at the output of the second optical modulator, and the light part emerging from the second output of the optical filter are launched through the coupler as an optical output signal in a fibre optic. The launched light is therefore made from two light parts: a light part modulated using the data signal along with one sideband carrier and an unmodulated light part with the second sideband carrier. This combined light lands in an optical receiver on a photodiode which produces the desired data signal in the millimeter (mm) wave range through coherent superimposition of both light parts.

In this known device, both light parts and the modulation of one of the two light parts is carried out in separate devices. Therefore this known device is more expensive to manufacture.

SUMMARY OF THE INVENTION

Therefore, it is the task of the invention to reduce the effort in creating both optical signal parts and/or the optical output signal through the procedure and the device named at the start.

This task is solved by the invention procedure by the optical signal being fed to two branches and in one of the two branches two optical sideband carriers are created with regard to the optical signal, of which one is removed, by the optical signal in one of the two branches having a data signal impressed, preferably an electrical one, and by both divided optical signal parts being then brought back together into one single optical output signal.

The procedure only requires a small amount of effort with regard to the number of components as the sideband carriers modulated by the data signal and the unmodulated reference signal can be created in one common unit. If the frequency spacing $f_m$ of the carrier band frequency $v_0$ to the sideband carrier frequency $v0 \pm fm$ is twice the above mentioned frequency spacing, i.e. $2\,F_m$, then, as in that case, this will likewise result in an unmodulated reference signal and a modulated carrier signal with a frequency spacing of $2\,F_m$. This procedure also allows the use of simple filters which only work in transmission, such as Fabry-Perot filters or fixed filters.

In a primary preferred embodiment of this procedure, both side-band carriers are created and the data signal impressed in the same branch.

In a second, different embodiment of the procedure, on the other hand, both sideband carriers are created in the one branch and the data signal is impressed in the other.

In this, preferably both sideband carriers are created through modulation by means of an electric mm wave signal using a fixed electrical frequency.

The above stated task is solved by the optical transmission device in the way described at the start using an optical separator which feeds the optical signal of the light source to two branches, a device in the first branch for creating two optical sideband carriers with regard to the optical signal, an optical filter arranged after the device for removing one of the two sideband carriers where the modulator impresses the optical signal with a data signal in one of the two branches, and an optical coupler which brings together both signal parts in both branches into one common optical output signal.

Using this optical transmission device, the advantages already listed with regard to the procedure can be achieved whereby the multi-channel suitability (transparency for all modulation types and modulation formats) of the known optical transmission device described at the start can be maintained.

In a first preferred embodiment of the optical transmission device, both the device for creating both sideband carriers as well as the modulator for impressing the data signal are in the same branch.

An advantageous continuation of this design form can have the device and modulator as a common modulator, for example as a Mach-Zehnder modulator. With this design continuation, the mm wave signal and the data signal are simultaneously modulated to the optical signal, whereby the number of components required in the optical transmission device is further reduced.

In another second design form of the optical transmission device, the device for creating both sideband carriers is in one branch and the modulator for impressing the data signal is in the other.

In one further aspect, the invention affects a telecommunication system with a fibre optic, an optical receiver and an optical transmission device as described above.

Further advantages of the invention can be seen in the description and the drawing. Likewise, the previously stated and listed characteristics of the invention can be used alone or in any combination. The shown and described design forms must not be seen as a final enumeration but as examples of the character of the invention.

BEST MODE FOR CARRYING OUT THE INVENTION

Figure 1:
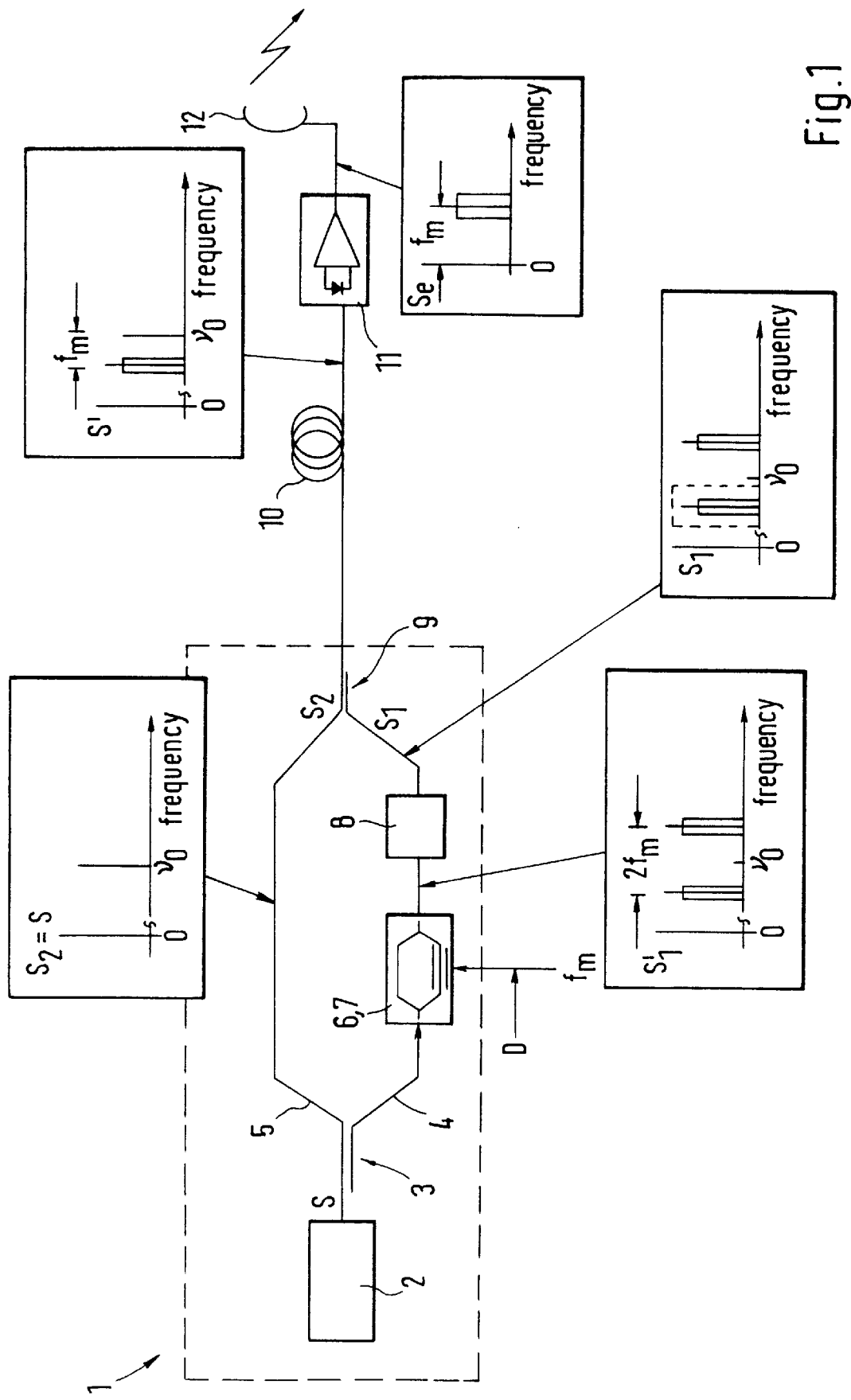
FIG. 1 a schematic block diagram of a telecommunication system with a primary design example of the invention optical transmission device, where the respective associated frequency spectra are also shown, and FIG. 2 a block diagram corresponding to FIG. 1 with a second design example of the invention optical transmission device, where the respective associated frequency spectra are also shown.

In the case of the optical transmission device marked with 1 in FIG. 1, the signal S with an established frequency $v_0$ is emitted from a light source 2, e.g. a laser (DFB laser) over a separator 3 to two branches 4, 5. Using a high-frequency modulator 6, such as a Mach-Zehnder modulator, two optical sideband carriers with the frequencies $v_0-f_m$ and $v_0+f_m$, i.e. with a frequency spacing of 2 $f_m$ in the millimeter (mm) wave range are created using the two sideband procedure and thus the frequency $v_0$ is suppressed. In both sideband carriers, a data signal D is modulated in a modulator 7 which forms a common unit with the modulator 6 and the band width of the modulator 6, 7 is the same or smaller than the mm wave frequency $f_m$. A sideband carrier in the design example in FIG. 1 with the higher frequency $v_0+f_m$ is removed using an optical filter 8, such as an optical transmission filter (Fabry-Perot, electrical fixed filter, etc.).

The signal part $S_1$ in the first branch 4 which has the lower frequency sideband carrier with the modulated data signal D, and the signal part $S_2$ in the second branch 5 which has the frequency $v_0$ are brought together using a coupler 9 into one common output signal S' which is fed through a fibre optic 10 to an optical receiver 11 (photodiode). There the modulated sideband carrier signal is subtracted from the unmodulated carrier frequency signal through differentiation, so that the transmitted data signal D is present as an electrical output signal Se in the mm wave frequency range $f_m$ at output 12.

Figure 2:
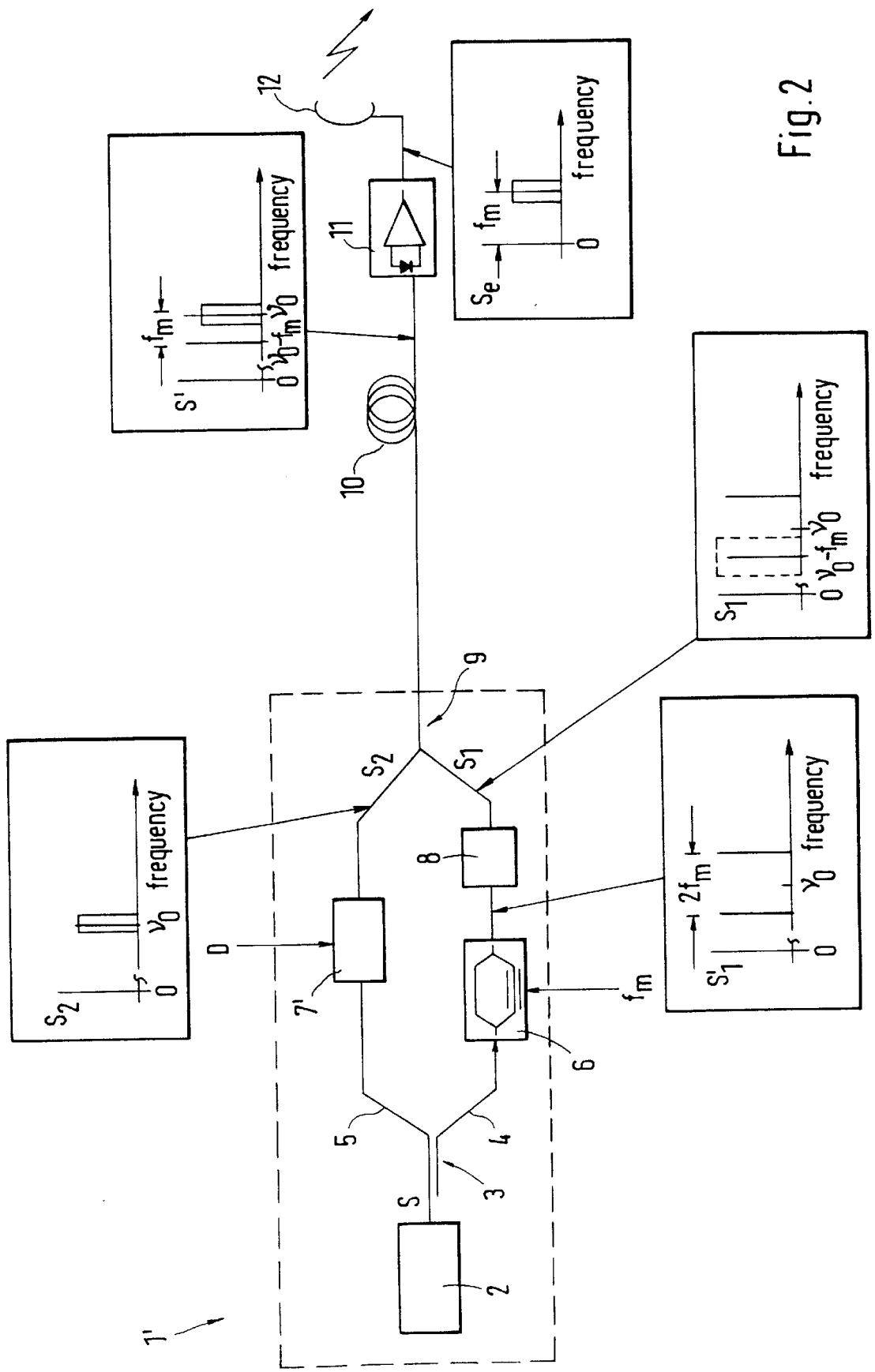

In the case of the design example of an optical transmission device 1' shown in FIG. 2, in modulator 6 two sideband carriers $v_0-f_m$ and $v_0+f_m$ are created of which one is removed in the optical filter 8 in the example of the higher frequency sideband carrier $v_0+f_m$. In the second branch 5, data signal D is modulated onto the optical signal S by means of an additional modulator 7', where the band width of the second modulator 7' is greater or the same as the frequency of the data signal D. Both signal parts $S_1$, $S_2$ are brought together again in the coupler 9, resulting in an optical output signal S' with an unmodulated frequency part $v_0-f_m$ and a frequency part $v_0$ modulated with the data signal D.

Both design examples thus result in a modulated signal part $v_0-f_m$ (FIG. 1) or $v_0$ (FIG. 2) and an unmodulated reference signal $v_0$ (FIG. 1) or $v_0-f_m$ (FIG. 2) whose frequency spacings are given by the modulation frequency $f_m$.

I claim:

1. A procedure for creating an optical output signal (S') in which two optical signal parts ($S_1$, $S_2$) of different frequencies are created from one optical signal ($v_o$), of fixed frequency where one of the two optical signal parts ($S_1$, $S_2$) is impressed with a data signal (D) and both optical signal parts ($S_1$, $S_2$) together form the optical output signal (S') characterised by the optical signal (S) being fed to two branches (4, 5) so that in one of the two branches (4, 5) two optical sideband carriers ($v_0-f_m$, $v_0+f_m$) are created with regard to the optical signal (S), of which one is removed, and by the optical signal (S) in one of the two branches (4, 5) being impressed with a data signal (D) and by the two divided optical signals ($S_1$, $S_2$) being then brought together as one single optical output signal (S').

2. A procedure according to claim 1, characterised by both sideband carriers ($v_o-f_m$, $v_0+f_m$) being created and the data signal (D) being impressed in the same branch (4).

3. A procedure according to claim 1, characterised by both sideband carriers ($v_0-f_m$, $v_0+f_m$) being created in one branch (4) and the data signal (D) being impressed in the other branch (5).

4. A procedure according to claim 3, characterised by both sideband carriers ($v_0-f_m$, $v_0+f_m$) being created through modulation by means of an electrical millimeter wave signal at an established electrical frequency ($f_m$).

5. An optical transmission device (1; 1') for creating an optical output signal (S') with two optical signal parts ($S_1$, $S_2$) comprising a device for creating the two optical output signal parts ($S_1$, $S_2$) from an optical signal (S) of established frequency ($v_0$) and a modulator (7; 7') which impresses a data signal (D) onto one of the two optical signals (S1, S2), characterised by an optical separator (3) which feeds the optical signal (S) of the light source to two branches (4, 5), a device (6) in the first branch (4) for creating two optical sideband carriers ($v_0-f_m$, $v_0+f_m$) with regard to the optical signal (S), an optical filter (8) arranged after the device (6) for removing one of the two sideband carriers ($v_0-f_m$, $v_0+f_m$), where the modulator (7, 7') impresses the optical signal (S) in one of the two branches (4, 5) with a data signal (D), and an optical coupler (9), which brings together the optical signal parts ($S_1$, $S_2$) in both branches (4, 5) into a common optical output signal (S').

6. An optical transmission device according to claim 5, wherein the device (6) for creating both sideband carriers ($v_0-f_m$, $v_0+f_m$) as well as the modulator (7) for impressing the data signal (D) are in the same branch (4).

7. An optical transmission device according to claim 6, wherein the device (6) and the modulator (7) are formed as a common modulator.

8. An optical transmission device according to claim 5, wherein the device (6) for creating both sideband carriers ($v_0-f_m$, $v_0+f_m$) is in one branch (4) and the modulator (7') for impressing the data signal (D) is in the other branch (5).

9. A telecommunication system with an optical fibre (10), an optical receiver (11) and an optical transmission device (1, 1'), wherein the optical device (1, 1') is for creating an optical output signal (S') with two optical signal parts ($S_1$, $S_2$) comprising a device for creating the two optical output signal parts ($S_1$, $S_2$) from an optical signal (S) of established frequency ($v_0$) and a modulator (7; 7') which impresses a data signal (D) onto one of the two optical signals ($S_1$, $S_2$), wherein an optical separator (3) feeds the optical signal (S) of the light source to two branches (4, 5), a device (6) in the first branch (4) creates two optical sideband carriers ($v_0-f_m$, $v_0+f_m$) with regard to the optical signal (S), an optical filter (8) is arranged after the device (6) for removing one of the two sideband carriers ($v_0-f_m$, $v_0+f_m$), where the modulator (7, 7') impresses the optical signal (S) in one of the two branches (4, 5) with a data signal (D), and where an optical coupler (9) brings together the optical signal parts ($S_1$, $S_2$) in both branches (4, 5) into a common optical output signal (S').

10. A procedure according to claim 1, characterised by both sideband carriers ($v_0-f_m$, $v_0+f_m$) being created through modulation by means of an electrical millimeter wave signal at an established electrical frequency ($f_m$).

* * * * *

UNITED STATES PATENT AND TRADEMARK OFFICE
CERTIFICATE OF CORRECTION

PATENT NO. : 6,021,236
DATED      : February 1, 2000
INVENTOR(S) : Harald Schmuck It is certified that error appears in the above-identified patent and that said Letters Patent is hereby corrected as shown below:

In column 4, line 32 (claim 5, line 6), "(S1, S2)" should be --($S_1$, $S_2$)--

Signed and Sealed this

Fourteenth Day of November, 2000

Attest:

Q. TODD DICKINSON

Attesting Officer     Director of Patents and Trademarks